Patented Nov. 3, 1942

2,300,992

UNITED STATES PATENT OFFICE 2,300,992

MERCURATED ALKYL AMIDES OF DIBASIC PHENYLENE ACIDS AND HOMOLOGUES THEREOF

Donalee L. Tabern, Lake Bluff, Ill., assignor to Abbott Laboratories, North Chicago, Ill., a corporation of Illinois No Drawing. Application May 15, 1939, Serial No. 273,725

5 Claims. (Cl. 260—434)

The present invention relates to pharmaceutical compositions and has for its principal object the preparation of novel compounds possessing properties making them adaptable for use in the diuretic field. A more specific object of the present invention is to provide mercurated alkyl amides of dibasic phenylene acids possessing diuretic activity of the type desired.

Certain types of mercury compounds in which the mercury group is attached to either an inorganic or organic radical, have the property of producing diuresis. Inorganic compounds of mercury, however, are highly toxic and the ratio between the effective dose and the toxic dose is such as to preclude their effective use in the diuretic field. The same difficulty exists in the case of most organic compounds of mercury, which are either too high in toxicity or too low in the desired therapeutic effectiveness for use in the medical art.

I have discovered that mercury derivatives of alkyl amides of dibasic aromatic acids, especially mercurated propyl amides of phthalic acid, are particularly effective diuretics, because of their high efficiency and relatively low toxicity. In other words, the compounds of the present invention possess a low diuretic dose and the ratio of the effective therapeutic dose to the toxic dose is unusually high. Of great importance, the new compounds are well tolerated during repeated injections. In addition, the compounds included in the present invention are soluble (or capable of being solubilized) and form stable solutions particularly adaptable for hypodermical administration.

The dibasic aromatic acids suitable for use in the present invention may be illustrated by the following general formula:

in which $R_1$ represents an aromatic ring such as the phenyl group; in which $R_2$ represents (a) hydroxyl (OH) group
(b) salt O-metal group such as —O—Na
(c) amide

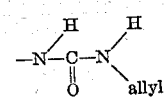

group, in which X and Y represent hydrogen atoms, saturated and unsaturated alkyl groups and hydroxy alkyl groups, and in which $R_3$ represents an active alkylene amide group such as:

(d)

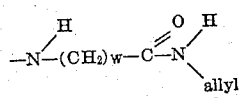

group in which Z represents a hydrogen atom, saturated and unsaturated alkyl groups.

(e)

$$-N-C-N\begin{matrix}H\\ \\allyl\end{matrix}$$

group, or (f)

$$-N-(CH_2)_w-C-N\begin{matrix}H\\ \\allyl\end{matrix}$$

group, where W represents a whole number.

The following specific examples of reactive alkylene amides of phthalic acid derivatives coming within the scope of the present invention will serve for illustrative purposes:

1. Monoallyl amide of phthalic acid.

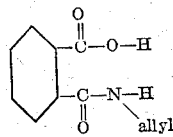

2. Monoallyl amide of sodium phthalate.

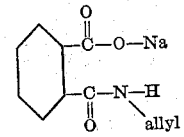

3. Monoallyl phthalamide.

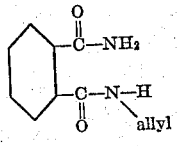

4. Monoallyl amide, monomethyl amide of phthalic acid.

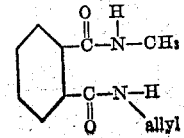

5. Bis-monoallyl phthalamide.

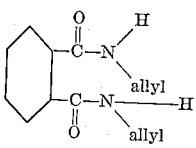

6. Monoallyl amide, monobutyl amide of phthalic acid.

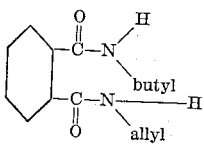

7. Monoallyl amide, diethyl amide of phthalic acid.

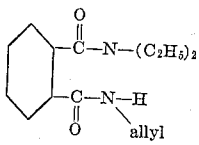

8. Monoallyl amide, monohydroxy ethyl amide of phthalic acid.

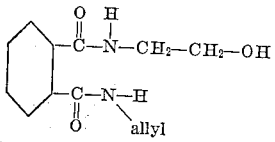

9. Di-allyl amide of sodium phthalate.

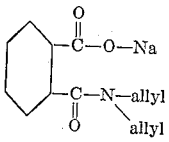

10. Monoallyl ureide of sodium phthalate.

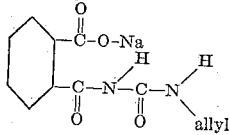

11. Bis-monoallylamide of terephthalic acid.

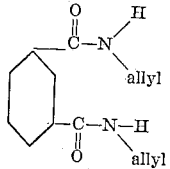

12. Monoallylamide, monopropylamide of phthalic acid.

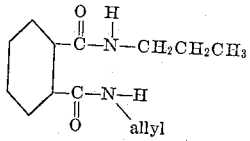

13. Monocrotonyl amide of sodium phthalate.

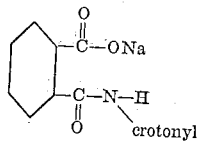

14. Monobutenyl amide; methyl, amyl amide of phthalic acid.

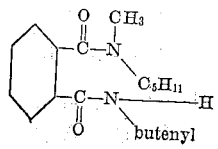

In the above formulas each compound has at least one unsaturated or alkylene amide group (—N alkylene group, e. g. allyl) which is capable of reacting with a mercury salt such as mercuric acetate, mercuric sulfate, etc. to yield mercuration products. When the parent compound has one alkylene or reactive group it is reacted with one mol. of mercury salt to form a mono-mercurated product, and when the parent compound has two or more such groups it is reacted with one, two or the corresponding mols of mercury salt to form mono- or di-mercurated products.

The mercuration carried out in a suitable aqueous solvent with mercuric acetate results in the formation of mercurated alkyl groups of which the following formulas are illustrative:

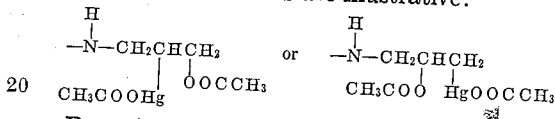

By natural hydrolysis, by neutralization with alkali, or by evaporation in vacuo the acetoxy groups are gradually eliminated being replaced by hydroxy groups resulting in the formation of mercurated alkyl groups of which the following formulas are illustrative:

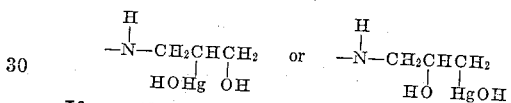

If another mercury salt, e. g. mercuric propionate, is used for mercuration the mercurated alkyl groups (except for presence of the corresponding acid radical or OCO alkyl group) may be represented by the above formulas. The final products if subject to hydrolysis have the double bond saturated by —HgOH and —OH groups.

If, as it is frequently desirable to carry out mercuration in an organic solvent such as methyl alcohol, the final product may have a —OCH$_3$ group (depending on the alcohol used) in place of the —OH group attached to the alkyl group represented by the above formula. Other liquids such as ether, etc., may likewise be employed for the mercuration reaction.

If desired, the mercuration products may be isolated as more or less crystalline solids by concentration in vacuo, and purified by washing with ether or in the case of those insoluble in dilute acids, by suitable acidification. The soluble products obtained in an aqueous reaction medium may be diluted to the proper concentration and used without isolation. The products containing a free carboxyl group (i. e. those containing no solubilizing group such as —ONa, —NH$_2$) are usually sparingly soluble and are dissolved by the addition of the requisite quantity of alkali.

The following examples describing the preparation of the alkylene amide intermediates and the preparation of the mercuration products therefrom will serve for illustrative purposes:

EXAMPLE I

*Mono - mercurated - propylamide, allylamide of phthalic acid*

To about 228 grams (4 mols) of allylamine dissolved in dry benzene is added slowly a dry benzene is added slowly a dry benzene solution containing about 203 grams (1 mol) of phthalyl chloride. At the conclusion of the reaction the reaction mixture is treated with an excess of alkali (e. g. caustic soda solution), the solvent layer separated and distilled. The product remaining after the distillation of the benzene may be distilled in high vacuo,—or preferably washed with dilute alkali and recrystallized from alcohol. This product, bis-monoallylamide of phthalic acid, melting sharply at 133-135° C., may also be prepared by reacting ethyl phthalate (preferably with gentle heating) with an excess of allylamine. If desired, the original preparation with the acid chloride may be carried out in an aqueous medium by replacing two of the mols of allylamine with an equivalent of sodium hydroxide.

The mercuration reaction may be advantageously carried out in water solution as follows: About 25 grams of bis-monoallylamide of phthalic acid prepared, for example, by one of the methods described above, are suspended in about a liter of water and treated slowly, with good stirring, with about 31.5 grams of mercuric acetate. The completion of the reaction may be determined by the absence of the customary tests for the presence of ionic mercury (e. g. no precipitate with NaOH, or no mercuric sulfide precipitate with H2S, etc.). Any small residue of unreacted amide may be separated from the reaction mixture by filtration. If desired, a mixture of equimolecular amounts of freshly precipitated mercuric oxide and mercuric acetate may be employed for mercuration. The temperature during the reaction may vary from 0°-95° C. without appreciably changing the course of the reaction or the mercuration product produced.

The aqueous solution prepared as above may be used directly after proper dilution for the production of diuresis. In practice it has been found advantageous to partially or completely neutralize the solutions with a base such as sodium hydroxide or ammonium hydroxide. Solutions having pH values of about 6-8 are of increased stability and assist in preventing irritation at the site of injection.

The mercuration reaction may also be carried out in a suitable organic solvent such as methyl alcohol. In this case after the complete removal of the solvent, the solid remaining should be washed with ether. This product dissolved in water gives a solution having the same physiological properties as the mono-mercurated reaction product obtained in the aqueous medium described above.

Example II

Di-mercurated bis-monopropylamide of phthalic acid

This product may be prepared in accordance with the method of Example I by reacting 1 mol. of bis-monoallyl amide of phthalic acid with 2 mols. of mercury salt. The di-mercurated product exerts, in terms of its mercury content, an equally intense diuretic action and corresponds in physiological properties to those of the mono-mercurated products.

Example III

Mono-mercurated monopropylamide of phthalic acid

The intermediate product may be prepared by adding about 1 mol. of allylamine to about 1 mol. of finely powdered phthalic anhydride suspended in benzene. The reaction is instantaneous and monoallylamide of phthalic acid separates in excellent yield. This product may be purified by extraction with considerable volume of dry ether or dissolved in sodium hydroxide solution and precipitated by addition of acid. The purified product melts at 110°-112° C.

The mercuration reaction as indicated in Example I, may be carried out in a number of ways. The following (one of the preferred methods) will serve for illustrative purposes:

To about 20.5 grams of monoallylamide of phthalic acid dissolved in methyl alcohol is added a methyl alcohol solution containing about 31.6 grams of mercuric acetate. After the reaction is complete, the solvent is largely evaporated and the residue then poured into a substantial volume of ether. Analysis of the granular mass which settles out indicates the product to have the following formula:

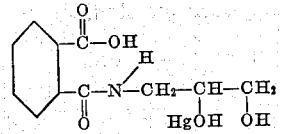

This product may be solubilized by treatment with one equivalent of alkali hydroxide e. g. sodium or potassium hydroxide. The alkali salt dissolves readily in water to form stable solutions adaptable for hypodermical administration.

Example IV

Mono-mercurated monopropylamide, hydroxy ethyl amide of phthalic acid

The intermediate product may be prepared as follows:

About 1 mol. of phthalic anhydride and about 1 mol. of monoethanol-amine are boiled in alcohol or fused together to form hydroxyethyl phthalimide with a melting point at 130° C. This product is next treated alone or in a solvent with an excess of allylamine. The reaction is spontaneous and the reaction product obtained is then washed with ether and recrystallized from ethyl acetate. The pure product, monoallylamide, hydroxy ethylamide of phthalic acid melts at about 85°-90° C.

This product may be mercurated by adding about 31.6 grams of mercuric acetate dissolved in water to an aqueous solution containing about 24.7 grams of the allyl-amide, hydroxy ethyl amide of phthalic acid. The hydroxy alkyl amide compounds (e. g. hydroxy—methyl, propyl, butyl, etc.) prepared by reacting the corresponding alkanol amine (which includes mono- and diamines) with phthalic anhydride are of particular interest as the hydroxy alkyl amide groups have been found to be of additional therapeutic importance.

Example V

Mono-mercurated monopropyl ureide of phthalic acid

Monoallyl urea and phthalic anhydride in molecular quantities are fused at about 120° C. to form the corresponding allyl ureide melting at 168°-170° C. This product is then mercurated in an aqueous solution in accordance with Example IV, sufficient alkali being added from time to time to maintain a clear solution. At the end of several days standing a small precipitate forms which may be separated by filtration. The reaction is complete when the clear solution fails to give an immediate dark precipitate with hydrogen sulfide.

In this example the

alkylene group is part of a complex substituent. Other compounds represented by the formula

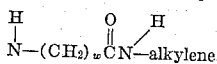

where $w$ equals 0 or 1, 2, 3, etc., are also included within the scope of the present invention. Where $w$ is zero (0) the compound is a ureide prepared from urea as described above. In the following group $w$ equals 2, —$NHCH_2CH_2CONH$ allyl.

The following are illustrative formulas of compounds of the present invention in which the mercurated alkyl amide group attached to the "C=O" group discussed in detail in the examples herein has been omitted.

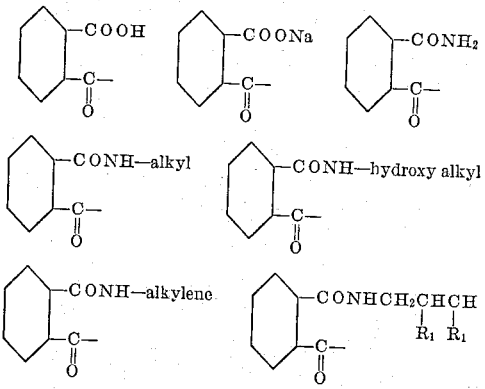

(in which the $R_1$'s are selected from the group consisting of $HgOH$, $HgOCOCH_3$, $OH$, $OCOCH_3$, —one of said $R_1$'s being one of said mercury groups.)

It will be obvious to those skilled in the art that the claims cover mono-mercurated alkyl amides of dibasic acids having a free carboxyl group or a substituted carboxyl (CO) group containing a solubilizing group such as O—Na, $NH_2$, $NHCH_3$, $NHCH_2CH_2OH$,

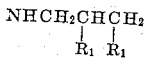

etc. It will also obvious to those skilled in the art that the claims cover di-mercurated alkyl amides of aromatic dibasic acids.

I claim:

1. A mercurated alkyl amide of an aromatic dibasic acid compound having the formula:

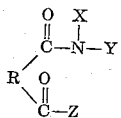

in which R is selected from the group consisting of the phenylene radical and homologues thereof, X and Y are selected from the group consisting of hydrogen and lower alkylene, alkyl and hydroxy alkyl groups and Z represents the mercurated alkyl amide group.

2. A mercurated alkyl amide of an aromatic dibasic acid compound having the formula:

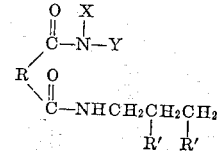

in which R is selected from the group consisting of the phenylene radical and homologues thereof, X and Y are selected from the group consisting of hydrogen and lower alkylene, alkyl and hydroxy alkyl groups and in which one of the R's is selected from the group consisting of HgOH and HgOCOA′ and the other R′ is selected from the group consisting of OH and OCOA′, in which the A's represent alkyl groups.

3. A compound having the following formula:

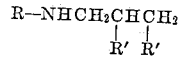

in which R represents an acyl group of an amide of phthalic acid and in which one of the R's is selected from the group consisting of HgOH and HgOCOCH$_3$ and the other R′ is selected from the group consisting of OH and OCOCH$_3$.

4. A compound having the following formula:

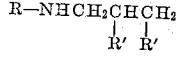

in which R represents an acyl group of a hydroxyl alkyl amide of phthalic acid and in which one of the R's is selected from the group consisting of HgOH and HgOCOCH$_3$ and the other R′ is selected from the group consisting of OH and OCOCH$_3$.

5. A compound having the following formula:

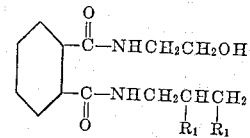

in which one of the $R_1$s is selected from the group consisting of HgOH and HgOCOCH$_3$ and the other $R_1$ is selected from the group consisting of OH and OCOCH$_3$.

DONALEE L. TABERN.